(12) United States Patent
MacKenzie

(10) Patent No.: US 8,538,980 B1
(45) Date of Patent: Sep. 17, 2013

(54) ACCESSING FORMS USING A METADATA REGISTRY

(75) Inventor: Chad M. MacKenzie, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1485 days.

(21) Appl. No.: 11/152,920

(22) Filed: Jun. 15, 2005

(51) Int. Cl.
*G06F 7/00* (2006.01)

(52) U.S. Cl.
USPC .......................................................... 707/769

(58) Field of Classification Search
USPC .......................................................... 707/769
See application file for complete search history.

(56) References Cited

U.S. PATENT DOCUMENTS

| | | | |
|---|---|---|---|
| 6,151,624 A * | 11/2000 | Teare et al. | 709/217 |
| 2003/0069803 A1* | 4/2003 | Pollitt | 705/26 |
| 2004/0064554 A1* | 4/2004 | Kuno et al. | 709/225 |
| 2004/0215635 A1* | 10/2004 | Chang et al. | 707/100 |
| 2004/0249774 A1* | 12/2004 | Caid et al. | 706/14 |
| 2005/0210263 A1* | 9/2005 | Levas et al. | 713/182 |
| 2006/0080397 A1* | 4/2006 | Chene et al. | 709/213 |

* cited by examiner

*Primary Examiner* — Shyue Jiunn Hwa

(74) *Attorney, Agent, or Firm* — Schwegman, Lundberg & Woessner, P.A.

(57) ABSTRACT

A method, an apparatus and a system perform accessing of electronic forms using a metadata registry. In some embodiments, a method includes receiving a request for an electronic form from a user. The method also includes accessing metadata for the electronic form from a metadata registry. The method includes accessing the electronic form based on the metadata for the electronic form from a content repository.

27 Claims, 8 Drawing Sheets

ACCESSING FORMS USING A METADATA REGISTRY

TECHNICAL FIELD

The application relates generally to data processing, and, more particularly, to accessing of electronic forms using a metadata registry.

BACKGROUND

Accessing electronic form data is typically from a traditional file or database system. Specifically, the forms and data incorporated therein are stored in a file system or a relational database system. Such a configuration often requires proprietary logic to be used to access the forms and data within such forms. Also, there is maintenance associated with storing the data in a given format to enable the proprietary logic to access the data. Therefore, access to the data is statically bound to its storage mechanism.

SUMMARY

According to some embodiments, a method, an apparatus and a system perform operations for accessing of electronic forms using a metadata registry. In some embodiments, a method includes receiving a request for an electronic form from a user. The method also includes accessing metadata for the electronic form from a metadata registry. The method includes accessing the electronic form based on the metadata for the electronic form from a content repository.

In some embodiments, a method includes storing metadata, in a registry object in a metadata registry, for an electronic form. The method also includes storing data of the electronic form into a content repository.

In some embodiments, a method includes receiving a request from a client of a number of clients for a form. The method includes accessing, through metadata stored in a metadata registry, parts of the form stored in one or more content repositories. The accessing is based on metadata that includes one or more associations among the parts of the form or one or more classifications of the parts of the form. The method also includes combining the parts of the form to generate a combined form. The method includes returning the combined form to the client.

In some embodiments, a method includes receiving a request from a first user for an electronic form. The method includes retrieving metadata associated with the electronic form from a metadata registry. The method also includes accessing the electronic form from a content repository. The method includes transmitting the electronic form back to the first user. Additionally, the method includes receiving at least a completed part of the electronic form back from the first user. The method also includes forwarding the at least completed part of the electronic form, based on a workflow that is part of the metadata associated with the electronic form, to a second user.

In some embodiments, an apparatus that includes a metadata registry to store a registry object of metadata for a form, wherein the form is stored in the metadata registry or a content repository. The apparatus also includes a form management module to receive a request for the form from a client device, wherein the form management module is to access the form through the metadata registry based on the metadata for the form.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for accessing of electronic forms using a metadata registry are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

Some embodiments use a metadata registry to manage different types of data content, including different types of electronic forms, the data completed by users of the electronics forms, etc. Some embodiments allow for user-extensibility of the metadata. Also, some embodiments allow for various applications of ontologies to classify the data, without duplicating the actual data. The metadata and ontology may be decoupled from the data content. As further described below, some embodiments provide platform-neutral operations for accessing data content and metadata.

Some embodiments interrelate content (such as form fragments, images, video, audio, etc.) to allow for assembly of the content into directly usable forms. For example, for an electronic form for travel authorization, the data content may include (1) a form fragment for information for the manager that is to approve the travel, (2) a form fragment for information on the travel destination, (3) a form fragment that includes an image that is incorporated into the form, etc. Accordingly, the registry object for this electronic form would include an association between this electronic form and these different form fragments. In particular, the association would be that the electronic form "contains" the form fragments. In some embodiments, the metadata may include reverse associations. Such associations allow for discovery of dependencies between business critical objects.

Figure 1:
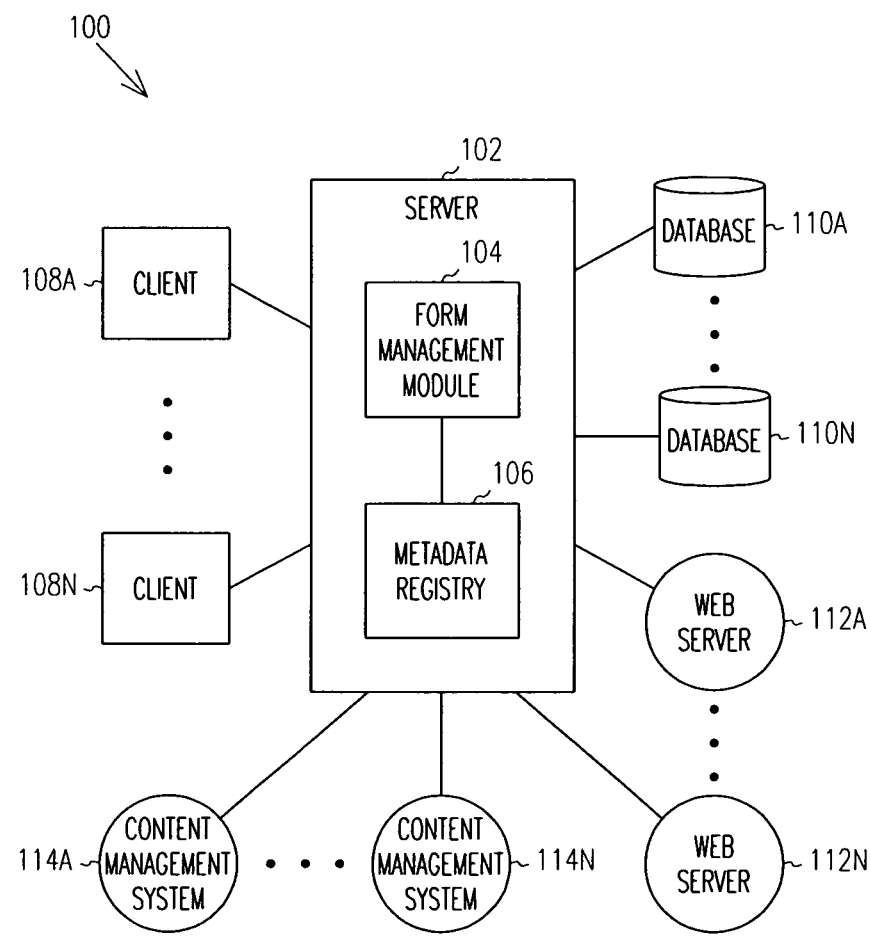
FIG. 1 illustrates a system for accessing of electronic forms using a metadata registry, according to some embodiments of the invention.

FIG. 1 illustrates a system for accessing of electronic forms using a metadata registry, according to some embodiments of the invention. In particular, FIG. 1 illustrates a system 100 that includes a server 102. The server 102 includes a form management module 104 and a metadata registry 106. The system 100 also includes clients 108A-108N, databases 110A-110N, web servers 112A-112N and content management systems 114A-114N. The clients 108 A-108N, databases 110A-110N, web servers 112A-112N and content management systems 114A-114N are coupled to the server 102. The databases 110A-110N, the web servers 112A-112N and the content management systems 114A-114N are representative of different types of data repositories for storage of data content. However, the data content may be stored in any type of machine-readable medium.

The form management module 104 may be representative of software, hardware, firmware or a combination thereof. For example, the form management module 104 may be software to be executed on a processor (not shown). An example architecture of the server 102 or any of the clients 108A-108N is described in FIG. 8 below.

The clients 108A-108N may be representative of one to a number of different client/user devices that may used to create, retrieve, store, edit, fill-in electronic forms. The clients 108A-108N may be representative of any apparatus, computer device, etc. For example, the clients 108A-108N may be a desktop computer, notebook computer, Personal Digital Assistant (PDA), a cellular telephone, etc. The clients 108A-108N may access electronic forms, data filled-in for these forms and other data associated with the electronic forms through the metadata registry 106. In particular, the clients 108A-108N may transmit communications to the form management module 104 for access to data content (including the forms and data associated therewith). The form management module 104 may access this data content through the metadata registry 106. The clients 108A-108N may also create, modify, delete the forms and associated data that are accessed through the metadata registry 106. The clients 108A-108N may be from one to a number of different submitting organizations. For example, a first set of clients 108 may be from Corporation X, while a second set of clients 108 may be from Corporation Y.

The metadata registry 106 may include metadata that is used to access the data content. For more information on the metadata registry 106, please refer to "ebXML Registry Information Model", Committee Draft 01, Feb. 10, 2005 and related amendments, which is hereby incorporated by reference. Also, please refer to "ebXML Registry Services and Protocols", Committee Draft 01, Feb. 10, 2005 and related amendments, which is hereby incorporated by reference.

In some embodiments, metadata includes different attributes associated with the data content, including the author, a description, a summary, its location in a data repository, its classifications, its associations with other data content, etc. In some embodiments, a form is defined as an object that provides variable field types that include text fill, binary option choice, one of many pre-defined option choices, etc. The form may be a single file or fragments of various components that are linked together. In some embodiments, form field entries include the data filled-in within the form by a user or client. The form field entries may be stored within the document/fragment field objects. In some embodiments, the form field entries may be processed for storage in a different location (e.g., a different data repository, such as a different server). As further described below, form field entries may also initiate an operation that may alter the form layout, content, transaction, etc.

In some embodiments, the data content may be stored within the metadata registry 106. Alternatively, some or all of the data content may be stored external to the metadata registry 106. For example, the data content may be stored in the databases 110A-110N, the web servers 112A-112N or the content management systems 114A-114N.

In some embodiments, metadata for data content may be stored in registry objects. The registry objects may be instances of information model classes, which may be defined by a number of different attributes. In some embodiments, an attribute of a registry object may defined by a name, a data type, whether the attribute is required to be specified and a default value. The attributes may also have an indication of whether the attribute is specified by the client, by the metadata registry or by both. The attributes may also indicate whether they may be modified once set to a given value.

Figure 2:
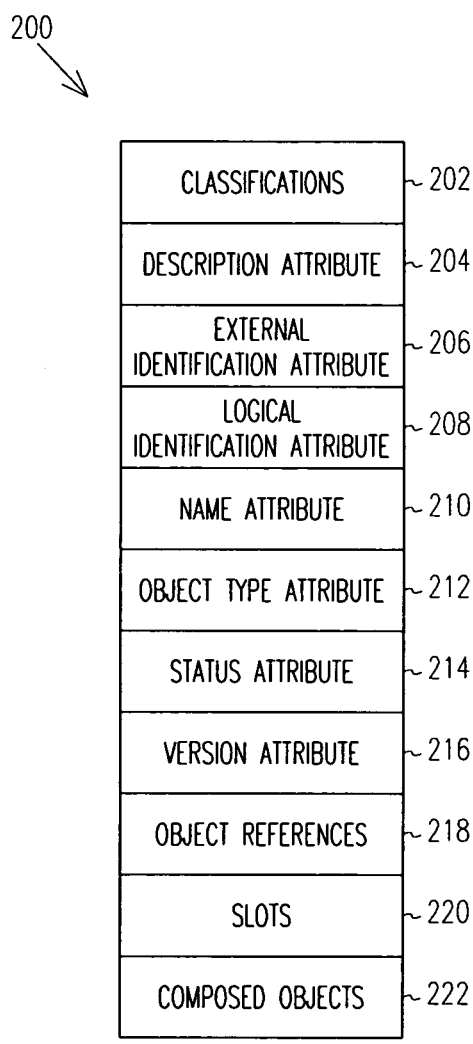
FIG. 2 illustrates parts of a registry object within a metadata registry, according to some embodiments of the invention.

FIG. 2 illustrates different attributes of a registry object that is stored in the metadata registry, according to some embodiments of the invention. In particular, FIG. 2 illustrates a registry object 200. The registry object 200 may include one or more classifications 202. These classifications 202 classify the registry object 200.

The registry object 200 also may include a description attribute 204. The description attribute 204 may include a textual description in a human readable form. In some embodiments, the description attribute 204 may be in any of a number of different languages.

The registry object 200 may include one or more external identification attributes 206. The external identification attribute 206 is an alternative identifier for the registry object 200. In some embodiments, the registry object 200 includes a logical identification attribute 208. The logical identification attribute 208 is used to reference a registry object 200, independent of the version of such object. Therefore, all versions of a registry object have the same logical identification attribute 208. The registry object 200 may include a name attribute 210, which may be in human readable form. The name attribute 210 may or may not be unique relative to other registry objects. In some embodiments, the registry object 200 includes an object type attribute 212.

In some embodiments, the registry object 200 includes a status attribute 214. The status attribute 214 is a life cycle indicator. In some embodiments, the metadata registry 106 assigns a value to the status attribute 214. In some embodiments, the status attribute 214 may have one of four states. A first state is approved, which is representative of a state wherein content has been submitted to the metadata registry 106 and has been subsequently approved. A second state is deprecated, which is representative of a state wherein content has been submitted to the metadata registry 106 and has been subsequently deprecated. A third state is submitted, which is representative of a state wherein content has been submitted to the metadata registry 106. A fourth state is withdrawn, which is representative of a state wherein content has been withdrawn from the metadata registry 106. The registry object 200 may also include a version attribute 216. The registry object 200 may include multiple versions, represented by the version attribute 216. Therefore, the version attribute 216 is assigned the version value for this registry object.

The registry object 200 may include one or more object references 218. The object references 218 reference another reference object 200. Accordingly, the registry object 200 may access data associated with the object being referenced. The object references 218 may reference objects in a same or different metadata registry 106.

The reference object 200 may also include one or more slots 220. The slots 220 provide a way to add attributes that are unique to particular objects in the metadata registry 106.

Examples of different types of slots 220 for electronic forms are now described. One slot 220 for an electronic form may store the identification of the user who created the file/folder that stores the electronic form. Another slot 220 may include the path where the file that stores the electronic form is stored in the metadata registry or a content repository. Another slot 220 may store the size of the file that stores the electronic form. Another slot 220 may store the user who last modified a file or folder. Another slot 220 may store the date that a file or folder was last modified. Another slot 220 may store the date that a file or folder was created. Another slot 220 may store the name of the form. Another slot 220 may store the description of a form. Another slot 220 may store help text associated with the form. Another slot 220 may store an indication whether the form is visible or not to the metadata registry 106.

Another slot 220 may store an indication that identifies what, if any, the allowable render types for a form may be. For example, the render type may be PDF, HTML, etc. Another slot 220 may store an indication of whether the form management module 104 is required to render the form. In particular, some PDF forms are static and therefore may be just transmitted to the client 108. Other PDF forms may need to be rendered by the form management module 104, prior to transmission to the client 108. Another slot 220 may store an indication of whether this form has user profile fields therein that are to be populated from the pre-filled data. The pre-filled data may include user preferences and stock information that may be filled in the form prior to the client 108 receiving the form. For example, for a time-off form, the name of the user and the name of the manager of the user may be filled in. Another slot 220 may store a set of reader extension rights selected for ubiquitising forms.

Another slot 220 may store a multi-value field that indicates which categories that a form is a part of. Another slot 220 may store an indication of whether to apply a watermark to a ubiquitised form. Another slot 220 may store a message to a user viewing a ubiquitised form.

In some embodiments, the slots 220 include a name and a sequence of values that may be assigned to the particular attribute. The slots 220 may also include a slot type, which allows different slots to be grouped together. The slot type may also be used to indicate a data type or value domain for the value(s) for the slot.

The registry object 200 may also include one or more composed objects 222. The composed objects 222 are instances of other registry objects. In such situation, the registry object 200 is defined as the composite object. In some embodiments, the relationship between the registry object 200 (the composite object) and the composed objects stored therein is a composition relationship. For such a relationship, if the composite object is deleted, copied, etc., such operations are cascaded to the composed objects. Therefore, the composed objects are also deleted, copied, etc.

The registry object 200 may be a superclass to a number of subclasses, in accordance with the object-oriented paradigm. In other words, a number of classes may inherit from the registry object 200. One type of subclass of the registry object 200 includes an extrinsic object. The extrinsic object may be used for storage of data into an external content repository (see the different content repositories in FIG. 1). The extrinsic object may include a content version. The extrinsic object may also include and "is Opaque" attribute, which indicates whether the content is opaque to the metadata registry 106.

Another type of subclass of the registry object 200 includes a registry package class. The registry package class allows for grouping of logically related registry object instances. In some embodiments, the logically related registry object instances may be from a same or different submitting organizations. In some embodiments, the logically related registry objects may include a group of artifacts that make up a form (e.g., a Portable Document Format (PDF) file, an image file, an Extensible Markup Language (XML) schema). Another type of subclass of the registry object 200 includes an external link class. The external link objects associate content in the metadata registry 106 with content that may be stored external to the metadata registry 106.

In some embodiments, a registry object may be associated with one or more other registry objects in the same or different metadata registry 106. One type of association is an intramural association. An intramural association is an association between two or more registry objects that are owned by a same user. Another type of association is an extramural association. An extramural association is an association between two or more objects, wherein at least one of such objects is not owned by the user creating the association.

Figure 3:
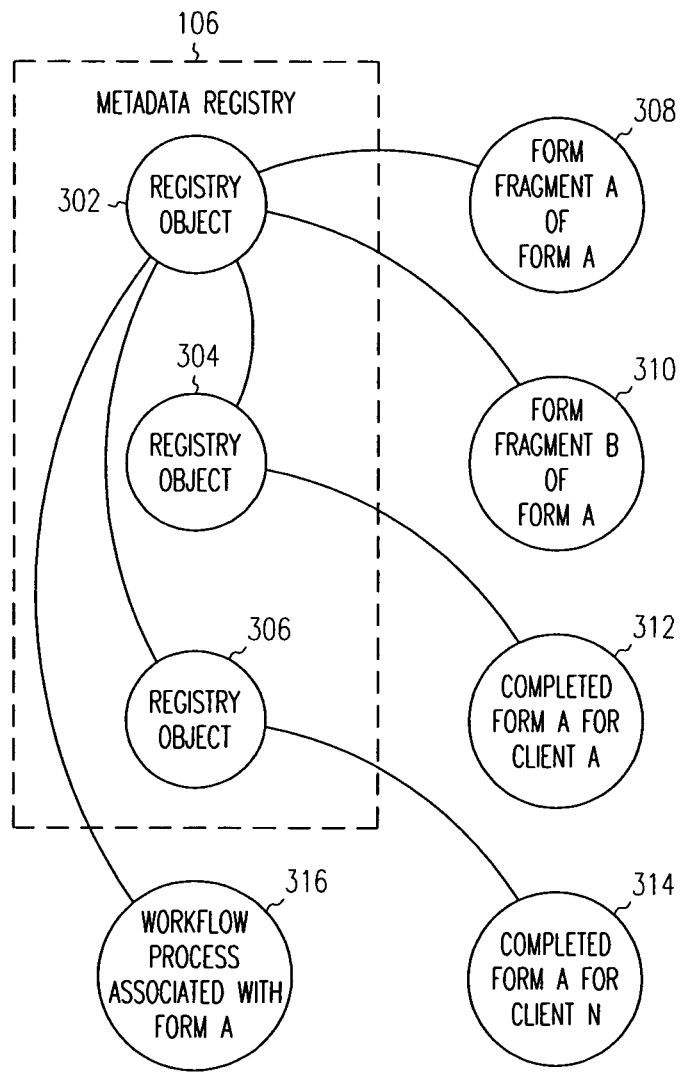
FIG. 3 illustrates associations between registry objects in the metadata registry and associated data content, according to some embodiments of the invention.

An example of associations among registry objects and associated content is now described. In particular, FIG. 3 illustrates associations between registry objects in the metadata registry and associated data content, according to some embodiments of the invention. In FIG. 3, the metadata registry 106 includes a registry object 302, a registry object 304 and a registry object 306. FIG. 3 also illustrates the storage of parts of a form A, filled-in data for the form A for multiple clients and a workflow associated with the form A. In particular, FIG. 3 includes a "form fragment A of the form A" data 308, a "form fragment B of the form A" data 310, a "completed form A for client A" data 312, a "completed form A for client N" data 314 and a "workflow process associated with the form A" data 316. The "form fragment A of the form A" data 308, the "form fragment B of the form A" data 310, the "completed form A for client A" data 312, the "completed form A for client N" data 314 and the "workflow process associated with the form A" data 316 may be stored on a same or different data repositories (e.g., referring to FIG. 1, the databases 110A-110N, the web servers 112A-112N or the content management systems 114A-114N).

The registry object 302 stores metadata for the form A, which includes the "form fragment A of the form A" data 308 and the "form fragment B of the form A" data 310. The registry object 304 stores metadata for form A, that was completed by client A—the "completed form A for client A" data 312. The registry object 306 stores metadata for completed form A, that was completed by client N—the "completed form A for client N" data 314. If the form A is accessed, the registry object 302 is used to retrieve the form fragment A and the form fragment B. For example, the form fragment A may be a first section of the form A, while the form fragment B may be a second section of the form A.

The registry object 302 is also associated with data content for a work flow—the "workflow process associated with the form A" data 316. In particular, the form A may have a "part of" association with the work flow (i.e., the form A is a part of the work flow). For example, the work flow process may be a process for requesting vacation time from work, wherein the form A is a vacation time form. The work flow process may include a series of steps that include (1) employee completion of a vacation time form; (2) forwarding to a manager for authorization; and (3) notification to the employee of whether the vacation time was approved.

An employee, who is using one of the clients 108, may request a vacation time form. The form management module 104 may retrieve the form using the registry object 302. The form management module 104 may return the combined form to the employee. After completion of the form, the employee may return the completed form to the form management module 104. Based on the work flow, the form management module 104 may forward the completed form to the employee's manager, which may be a different client 108, for approval. After receiving the approved form from the manager, the form management module 104 stores the complete form based on a new registry object (e.g., registry object 304). The form management module 104 may then notify the employee of the approval. As shown, in some embodiments, a new registry object is created for each completed form. Therefore, the data of each completed form may be separately stored.

Figure 4:
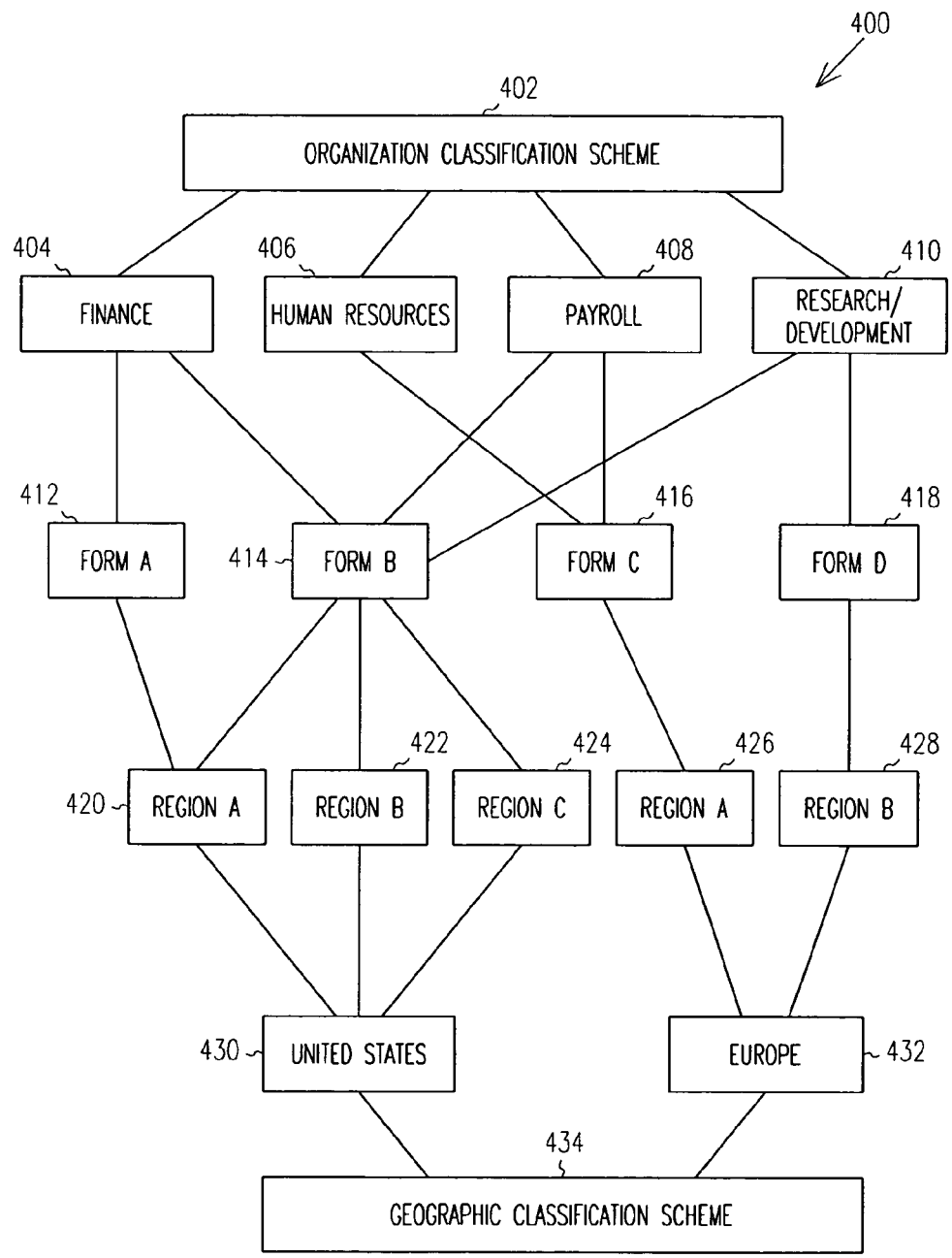
FIG. 4 illustrates a classification tree of forms for registry objects in a metadata registry, according to some embodiments of the invention.

In some embodiments, the registry objects may be classified one to a number of different ways. Examples of the types of classifications for forms may include industry, a process, products/services, geographic location, temporal, roles. FIG. 4 illustrates a classification tree of forms for registry objects in a metadata registry, according to some embodiments of the invention. FIG. 4 includes a form A 412, a form B 414, a form C 416 and a form D 418. The form A 412, the form B 414, the form C 416 and the form D 418 are classified in accordance with two different classification schemes—organization and geographic. Forms may be classified based on any of a number of different classification schemes.

An organization classification scheme 402 includes a finance classification 404, a human resources classification 406, a payroll classification 408 and a research/development classification 410. A geographic classification scheme 434 includes a United States classification 430 and a Europe classification 432. The United States classification 430 includes a region A classification 420, a region B classification 422 and a region C classification 424. The Europe classification 432 includes a region A classification 426 and a region B classification 428.

For the organization classification, the form A 412 is a part of the finance classification 404. For the geographic classification, the form A 412 is a part of the region A classification 420. For the organization classification, the form B 414 is a part of the finance classification 404, the payroll classification 408 and the research/development classification 410. For the geographic classification, the form B 414 is a part of the region A classification 420, the region B classification 422 and the region C 424.

For the organization classification, the form C 416 is a part of the human resources classification 406 and the payroll classification 408. For the geographic classification, the form C 416 is a part of the region A classification 426. For the organization classification, the form D 418 is a part of the research/development classification 410. For the geographic classification, the form D 418 is a part of the region B classification 428. Therefore, these different classifications for the different forms may be stored in the registry object (as shown in FIG. 2).

Figure 5:
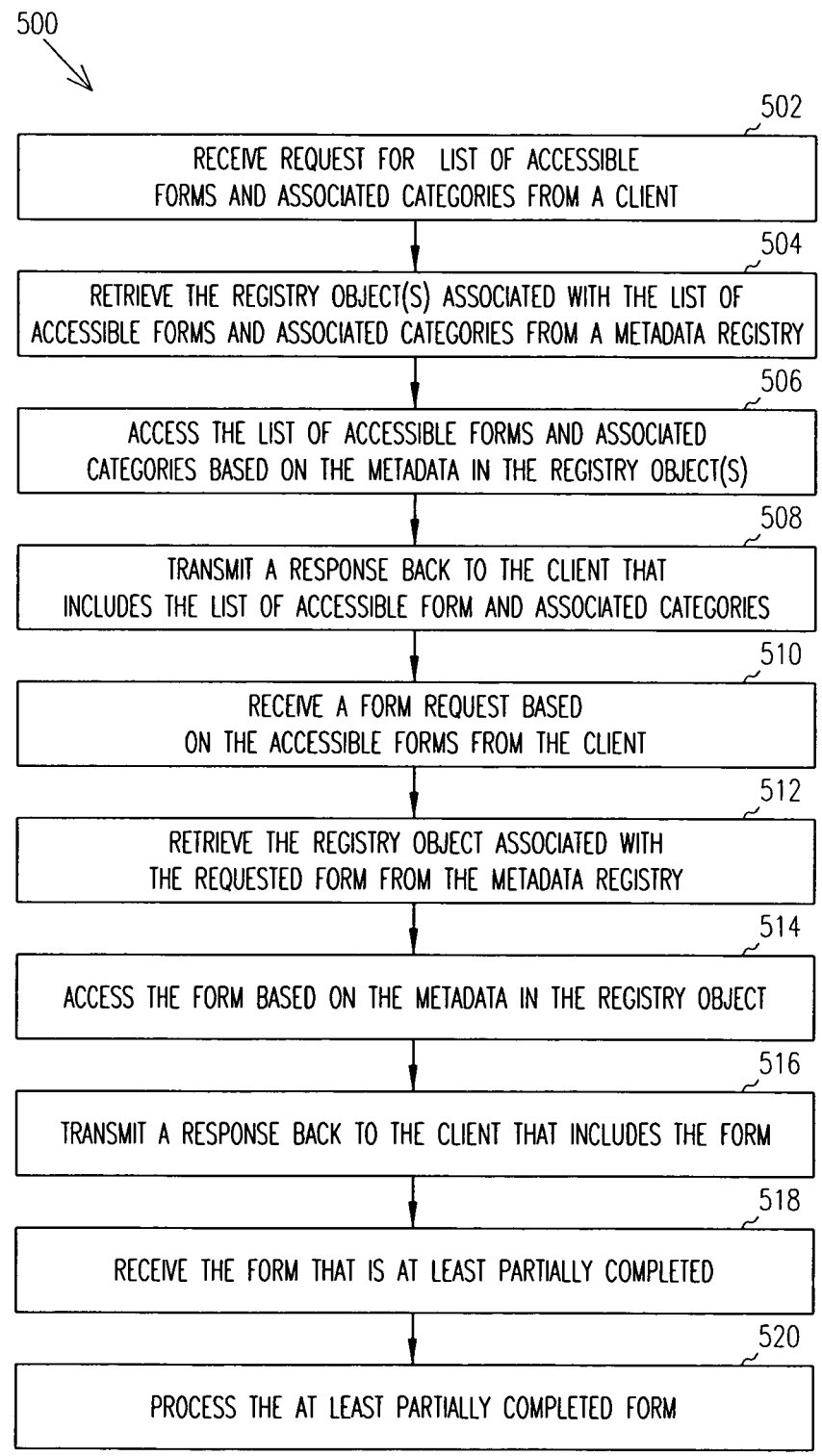
FIG. 5 illustrates a flow diagram for accessing of electronic forms using a metadata registry, according to some embodiments of the invention.

The metadata registry 106 may be used for any of a number of different accesses of electronic forms, filled-in data of these electronic forms and other data associated therewith. An example of retrieving and completing a form using the metadata registry 106 is now described. FIG. 5 illustrates a flow diagram for accessing of electronic forms using a metadata registry, according to some embodiments of the invention.

The flow diagram 500 illustrates the operations of the form management module 104 and the metadata registry 106, according to some embodiments of the invention. The flow diagram illustrates an exemplary operation, wherein a client receives a request to fill-in an electronic form.

At block 502, the form management module 104 receives a request for a list of accessible forms and categories thereof from the client 108. With reference to FIG. 1, one of the clients 108 may transmit the request using a software application that allows for the accessing of electronic forms. For example, the client 108 may be attempting to complete an electronic form for taking vacation time from work, accessing personnel information, etc. The flow continues at block 504.

At block 504, the metadata registry 106 retrieves the registry object(s) associated with the list of accessible forms and associated categories. The form management module 104 may request the list of accessible forms for a given client and the categories of such forms from the metadata registry 106. The metadata registry 106 may access the particular registry object(s). In some embodiments, a registry object in the metadata registry 106 may include references to all of the forms available based on the identification of the client 108, the identification of which group the client 108 is a member, etc. For example, a table may store the types of forms and categories of such forms for a given group of clients. The table may be stored in one of the content repositories and a registry object may store metadata for this table. The flow continues at block 506.

At block 506, the metadata registry 106 retrieves the list of accessible forms and associated categories based on the metadata in the registry object(s). The list of accessible forms and associated categories may be stored within the metadata registry or one or more of the content repositories. The flow continues at block 508.

At block 508, the form management module 104 transmits a response back to the client 108 that includes the list of accessible forms and associated categories. The metadata registry 106 may return this data to the form management module 104. The form management module 104 may transmit this data back to the client 108, in accordance with the protocol there between. The flow continues at block 510.

At block 510, the form management module 104 receives a form request from the client 108 based on the list of accessible forms and associated categories. The client 108 may select the form from the list and transmit a communication requesting this form. The flow continues at block 512.

At block 512, the metadata registry 106 retrieves the registry object associated with the requested form. The form management module 104 transmits a request for the registry object based on the form request. The metadata registry 106 may locate the registry object based on a unique identification for the registry object that includes the metadata for the form. The unique identification may be transmitted by the client 108 as part of the request. In particular, the list of forms may include the identifications for those forms. The flow continues at block 514.

At block 514, the metadata registry 106 accesses the form based on the metadata in the registry object. The form may be stored in the metadata registry or in one or more of the content repositories. The metadata may include the address of the content repository and the address therein for the form. For example, the address may include the address of the content management system 114A and an address therein. Therefore, the metadata registry 106 retrieves the form based on these addresses. The flow continues at block 516.

At block 516, the form management module 104 transmits a response back to the client 108 that includes the requested form. The metadata registry 106 may return this form to the form management module 104. The form management module 104 may transmit this data back to the client 108, in accordance with the protocol there between. The flow continues at block 518.

At block 518, the form management module 104 receives the form that is at least partially completed from the client 108. The client 108 may complete different parts of the electronic form. For example, if the form is for vacation time, the client 108 may fill in data that include the name of the employee, the days for which vacation time is being requested, etc. The flow continues at block 520.

At block 520, the metadata registry 106 processes the at least partially completed form. The processing may include creation of a new registry object based on the filled-in data, the storage of the filled-in data in a content repository, the triggering of another operation in a work flow that the form is a part of, etc. To better illustrate, FIGS. 6 and 7 illustrates examples of different data flow operations for processing of the form.

Figure 6:
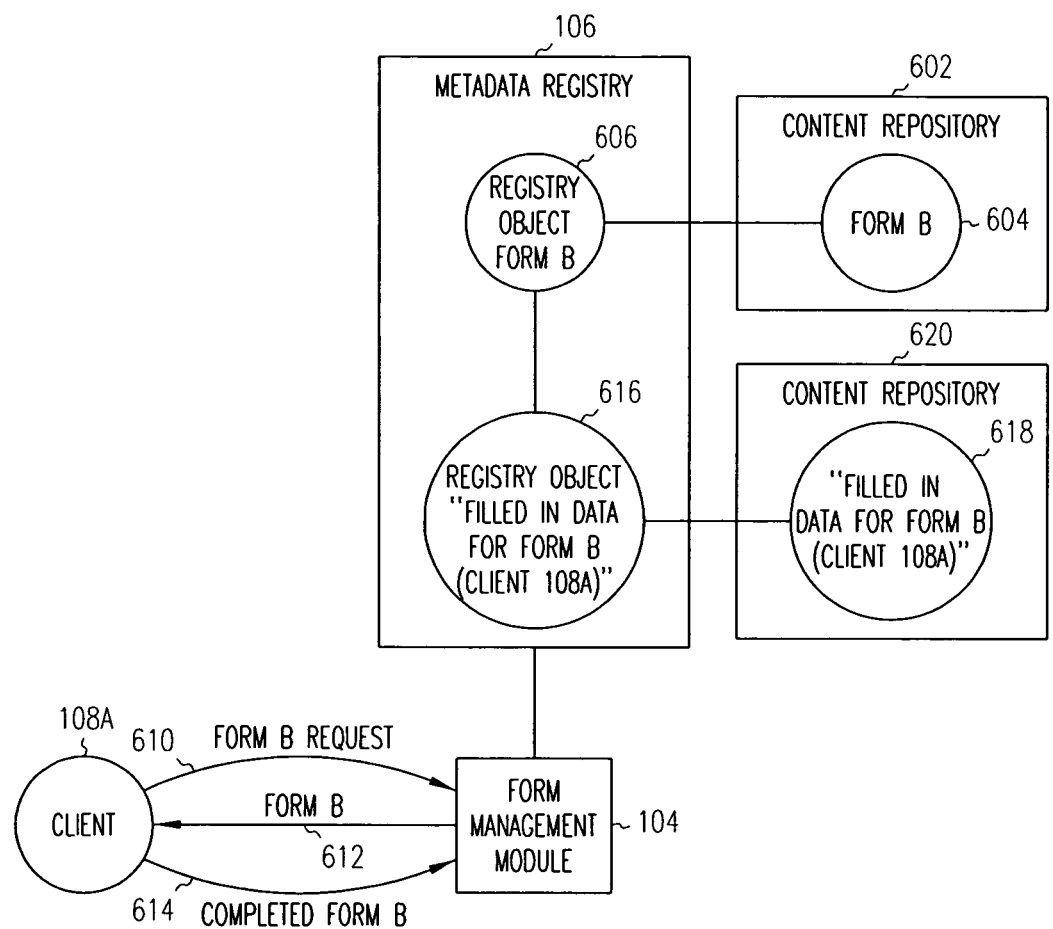
FIG. 6 illustrates data flow operations for accessing electronic forms using a metadata registry, according to some embodiments of the invention.
Figure 7:
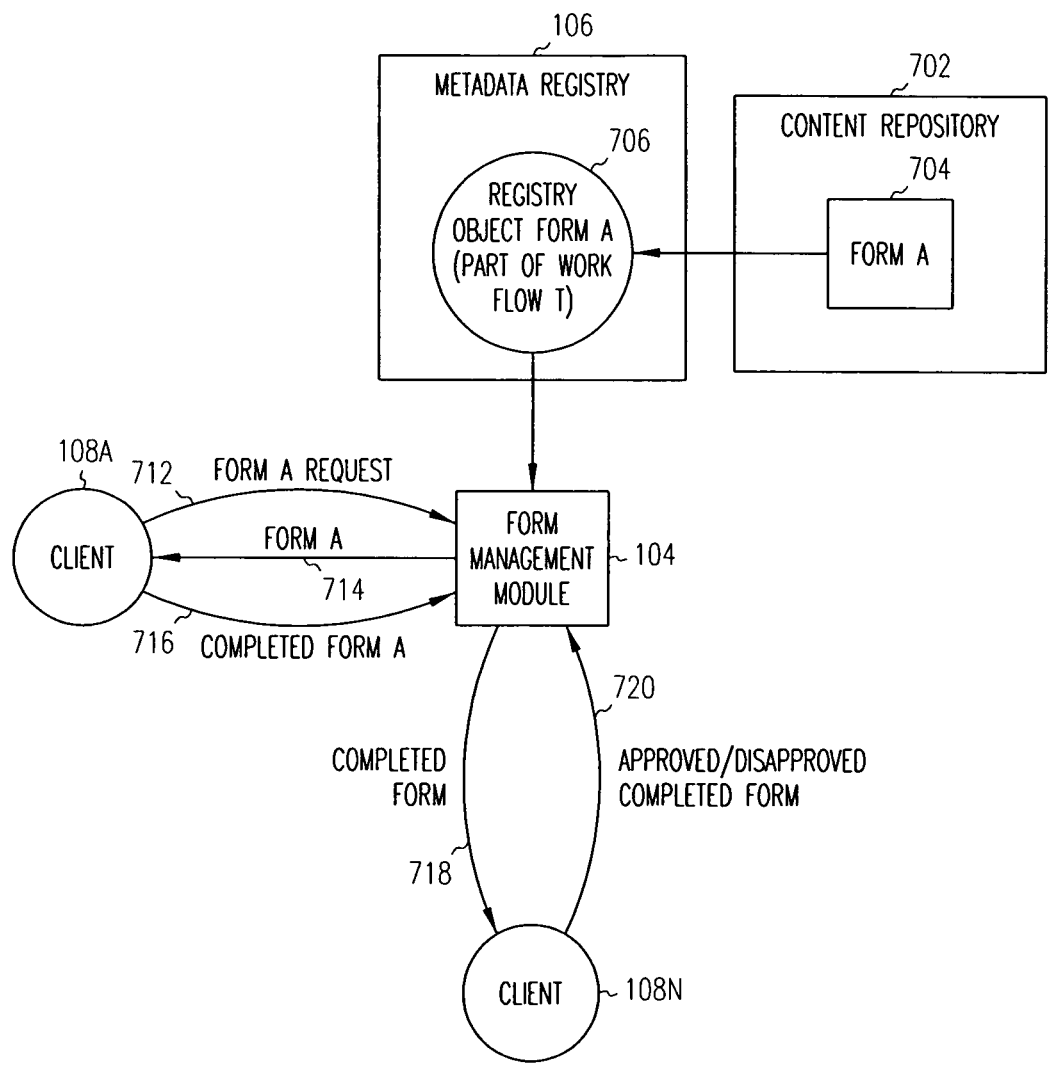
FIG. 7 illustrates data flow operations for accessing electronic forms using a metadata registry, according to some embodiments of the invention.

FIG. 6 illustrates data flow operations for accessing electronic forms using a metadata registry, according to some other embodiments of the invention. In particular, FIG. 6 illustrates a data flow operation wherein a form, which is completed is stored as a new registry object in the metadata registry 106. As shown, the metadata registry 106 includes a registry object 606 that is for form B and a registry object 616 (which is filled-in data for form B from client 108A). The metadata registry 106 is coupled to a content repository 602 and a content registry 620. The content registry 602 stores the form A (604), and the content registry 620 stores the filled-in data for form B from client 108A (618). The metadata registry 106 is coupled to the form management module 104, which is coupled to the client 108A.

In operation, the client 108A transmits a request for form B (dataflow 610). As described above, the form management module 104 retrieves the form B using the metadata registry 106. The form management module 104 transmits the form B back to the client 108A (dataflow 612). The client 108A returns the completed form B back to the form management module 104 (dataflow 614). The form management module 104 returns this completed form to the metadata registry 106. The metadata registry 106 creates a registry object for this filled-in form (registry object 616). The metadata registry 106 also stores the filled-in data in a content registry (618). The metadata registry 106 may also create an association between the registry object 606 for the Form b and the registry object 616 for the filled-in data.

In some embodiments, the electronic form may be part of a workflow. FIG. 7 illustrates data flow operations for accessing an electronic form (that is part of a workflow) using a metadata registry, according to some embodiments of the invention. In particular, FIG. 7 illustrates a data flow operation wherein a form is part of a workflow that requires approval of the form by a different client 108. As shown, the metadata registry 106 includes a registry object 706 that is for form A, which is a part of a workflow T. The metadata registry 106 is coupled to a content repository 702 that stores the form A (704). The metadata registry 106 is coupled to the form management module 104, which is coupled to the clients 108A and 108N.

In operation, the client 108A transmits a request for form A (dataflow 712). As described above, the form management module 104 retrieves the form A using the metadata registry 106. The form management module 104 transmits the form A back to the client 108A (dataflow 714). The client 108A returns the completed form A back to the form management module 104 (dataflow 716). The form management module 104 returns this completed form to the metadata registry 106.

Based on the metadata for this registry object, the metadata registry 106 causes the form management module 104 to transmit the completed form to the client 108N (data flow 718). In particular, the registry object includes an association with the workflow T. The workflow T may be part of a separate registry object and data content. The workflow T indicates that the next operation is approval by client 108N of the form A. The client 108N transmits the approved/disapproved complete form back to the form management module 104. The client 108N may approve or disapprove of the form.

Similar to the operations in FIG. 6, the metadata registry 106 may create a registry object for this approved/disapproved form. The metadata registry 106 may also store the approved/disapproved form in a content registry. The metadata registry 106 may also create an association between the registry object 706 for the form A and this newly created registry object for the approved/disapproved form. The metadata registry 106 may also create an association between the workflow T and this newly created registry object for the approved/disapproved form. In some embodiments, based on the workflow T, the form A may traverse any of a number of approvals, thereby being transmitted to a number of different clients.

While FIGS. 5-7 illustrate access to the metadata registry 106 for retrieving, completing and processing of a form, some embodiments may allow for other types of accesses. For example, the clients 108 may create forms. The metadata registry 106 may create one or more registry objects based on the forms created by the clients 108. The request to create the forms may include which categories the form is a part of, which associations with other forms and other registry objects in the metadata registry 106, etc. For example, if a form is created to be a form for the human resources department for employees that reside in southwest region of the United States, the metadata registry 106 creates the registry object for this form and assigns this form to be a part of at least two categories—a human resource category for an organization and for the southwest region of the United States for the geographic classification. Moreover, the form may be assigned to have an association with a workflow. For example, the form may be a part of a workflow for new employees. The workflow may require that the new employees complete this form. Furthermore, some embodiments allow the clients 108 to delete and modify forms and associated data using the metadata registry 106.

Figure 8:
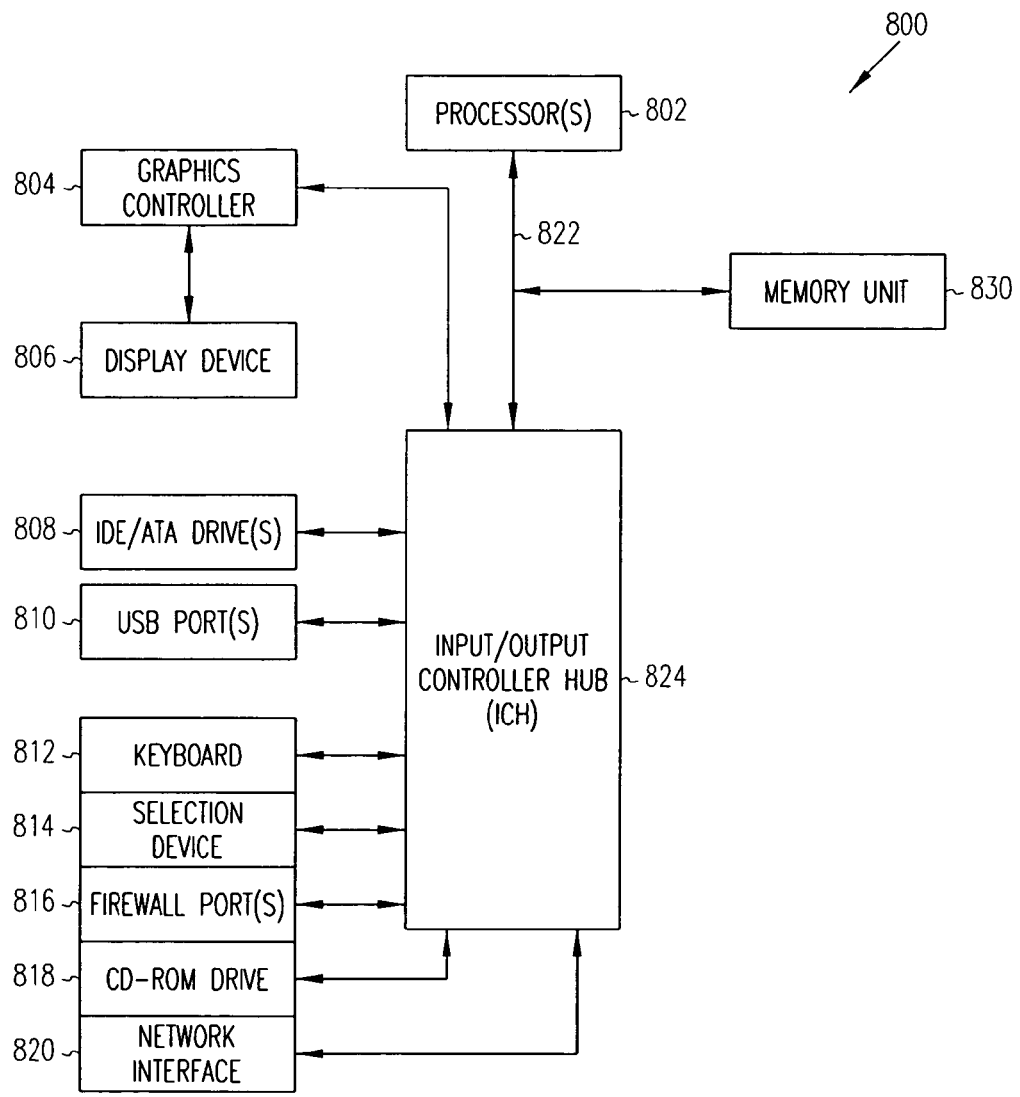
FIG. 8 illustrates a computer device that executes software for performing operations related to accessing electronic forms using a metadata registry, according to some embodiments of the invention.

An exemplary architecture wherein software performs operations related to accessing electronic forms using a metadata registry, as described herein, is now described. In particular, FIG. 8 illustrates a computer device that executes software for performing operations related to accessing electronic forms using a metadata registry, according to some embodiments of the invention. FIG. 8 illustrates a computer device 800 that may be representative of the server 102 or one of the clients 108A-108N.

As illustrated in FIG. 8, the computer device 800 comprises processor(s) 802. The computer device 800 also includes a memory unit 830, processor bus 822, and Input/Output controller hub (ICH) 824. The processor(s) 802, the memory unit 830, and the ICH 824 are coupled to the processor bus 822. The processor(s) 802 may comprise any suitable processor architecture. The computer device 800 may comprise one, two, three, or more processors, any of which may execute a set of instructions in accordance with embodiments of the invention.

The memory unit 830 may store data and/or instructions, and may comprise any suitable memory, such as a random access memory (DRAM). For example, the memory 830 may be a Synchronous RAM (SRAM), a Synchronous Dynamic RAM (SDRAM), DRAM, a double data rate (DDR) Synchronous Dynamic RAM (SDRAM), etc. The computer device 800 also includes IDE drive(s) 808 and/or other suitable storage devices. A graphics controller 804 controls the display of information on a display device 806, according to some embodiments of the invention.

The input/output controller hub (ICH) 824 provides an interface to I/O devices or peripheral components for the computer device 800. The ICH 824 may comprise any suitable interface controller to provide for any suitable communication link to the processor(s) 802, memory unit 830 and/or to any suitable device or component in communication with the ICH 824. For one embodiment of the invention, the ICH 824 provides suitable arbitration and buffering for each interface.

For some embodiments of the invention, the ICH 824 provides an interface to one or more suitable integrated drive electronics (IDE) drives 808, such as a hard disk drive (HDD) or compact disc read only memory (CD ROM) drive, or to suitable universal serial bus (USB) devices through one or more USB ports 810. For one embodiment, the ICH 824 also provides an interface to a keyboard 812, mouse 814, CD-ROM drive 818, or other suitable devices through one or more firewire ports 816. In some embodiments, the ICH 824 also provides a network interface 820 though which the computer device 800 can communicate with other computers and/or devices. In some embodiments, the ICH 824 is connected to a wireless interface, which enables the computer device 800 to wirelessly connect to computing devices using any suitable wireless communication protocol (e.g., 802.11b, 802.11g, etc.).

In some embodiments, the computer device 800 includes a machine-readable medium that stores a set of instructions (e.g., software) embodying any one, or all, of the methodologies described herein. Furthermore, software can reside, completely or at least partially, within memory unit 830 and/or within the processor(s) 802.

If the computer device 800 is representative of the server 102, the memory 830 and/or one of the IDE/ATA drives 808 may store the form management module 104 and the metadata registry 106. In some embodiments, the form management module 104 and the metadata registry 106 may be instructions executing within the processor(s) 802. The form management module 104 and the metadata registry 106 may be stored in a machine-readable medium that are a set of instructions (e.g., software) embodying any one, or all, of the methodologies described herein. The form management module 104 and the metadata registry 106 may reside, completely or at least partially, within the memory 830, the processor(s) 802, one of the IDE/ATA drive(s) 808, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), etc.

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for accessing of electronic forms using a metadata registry, in accordance with some embodiments of the invention. A flow diagram illustrates the operations for accessing of electronic forms using a metadata registry, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   receiving a request for an electronic form from a user, the electronic form comprising at least one field to be completed by the user;

accessing, by processor of a machine, metadata for the electronic form from a registry object in a metadata registry, the metadata indicating an address of a content repository storing the electronic form;

accessing the electronic form from the content repository based on the address indicated by the metadata from the registry object in the metadata registry;

transmitting the electronic form to the user;

receiving, from the user, the electronic form with the at least one field completed by the user;

causing storage of the electronic form with the at least one field completed by the user in the content repository at a different address;

causing creation of a new registry object based on the electronic form with the at least one field completed, the new registry object including metadata for the different address; and causing creation of an association between the registry object for the electronic form and the new registry object for the electronic form with the at least one field completed at the metadata registry.

2. The method of claim 1, further comprising:

populating at least one user profile field in the electronic form, prior to transmitting the electronic form to the user.

3. The method of claim 1, wherein the metadata includes an identification of a user that created the electronic form.

4. The method of claim 3, wherein the metadata includes an indication of whether the electronic form may be rendered.

5. A method comprising:

storing metadata that includes an address for an electronic form located at a content repository into a registry object in a metadata registry for the electronic form;

storing data of the electronic form into the content repository at the address;

transmitting, by a processor of a machine, the electronic form accessed from the address of the content repository to a user;

receiving the electronic form with data filled in by the user;

causing storage of the electronic form with the data filled in by the user in the content repository at a different address;

causing creation of a new registry object based on the electronic form with the data filled in by the user, the new registry object including metadata for the different address; and causing creation of an association between the registry object for the electronic form and the new registry object for the electronic form with the data filled in by the user at the metadata registry.

6. The method of claim 5, wherein storing the metadata comprising creating the registry object to store the metadata.

7. The method of claim 5, wherein the metadata includes an indication of a render type for the electronic form.

8. The method of claim 5, further comprising:

creating a different registry object in the metadata registry for the data filled by the user;

storing the data filled in by the user into the content repository.

9. A machine-readable storage medium that provides instructions machine, cause said machine to perforin operations comprising:

receiving a request from a client of a number of clients for a form comprising at least one field to be completed by a user;

accessing, through metadata stored in a metadata registry, each part of the form stored in one or more content repositories based on an address for each part of the form identified from the metadata in the metadata registry, the accessing is based on metadata that includes one or more associations among the parts of the form or one or more classifications of the parts of the form;

combining the parts of the form accessed from the one or more content repositories based on the address for each part of the form to generate a combined form;

returning the combined form to the client;

receiving, from the client, the electronic form with the at least one field completed by the user;

causing storage of the form with the at least one field completed by the user in one of the one or more content repositories at a different address;

causing creation of a new registry object based on the form with the at least one field completed, the new registry object including metadata for the different address; and causing creation of an association between the registry object for the form and the new registry object for the form with the at least one field completed at the metadata registry.

10. The machine-read able storage medium of claim 9, wherein the parts of the form include form fragment data, a video file or an audio file.

11. The machine-readable storage medium of claim 9, wherein the one or more associations are defined by one or more of the number of clients.

12. The machine-read able storage medium of claim 9, further comprising populating at least one user profile field in the combined form, prior to returning the combining form to the client.

13. The machine-readable storage medium of claim 9, wherein the metadata includes an indication of a render type for the form.

14. A machine-readable storage medium that provides instructions which, when executed by a machine, cause said machine to perform operations comprising:

receiving a request from a first user for an electronic form;

retrieving metadata that identifies an address of a content repository associated with the electronic form from a metadata registry;

accessing the electronic form from the content repository based on the address in the metadata;

transmitting the electronic form back to the first user;

receiving at least a completed part of the electronic form back from the first user;

determining a workflow process associated with the metadata for the electronic form; and forwarding the at least completed part of the electronic form, based on workflow process that is part of the metadata associated with the electronic form, to a second user;

causing storage of the data derived from the at least completed part of the electronic form in the content repository;

causing creation of new metadata related to data derived from the at least completed part of the electronic form; and creating an association between the metadata for the electronic form and the new metadata for the electronic form with the at least one completed part of the electronic form at the metadata registry.

15. The machine-readable storage medium of claim 14, further comprising receiving an approval or disapproval of the electronic form from the second user.

16. The machine-readable storage medium of claim 15, further comprising transmitting a communication, based on the workflow, to the first user that indicates the approval or disapproval of the electronic form.

17. The machine-readable storage medium of claim 15, wherein the metadata includes an identification of a user that created the form.

18. The machine-readable storage medium of claim 14 wherein the metadata includes an indication of a render type for the electronic form.

19. The machine-readable storage medium of claim 14, wherein the content repository comprises content management system, a file system or a web server.

20. The machine-readable storage medium of claim 19, wherein the metadata includes an indication of whether the form may be rendered.

21. An apparatus comprising:
a processor of a machine;
a metadata registry to store, using the processor of the machine, a registry object of metadata for a form, the form is stored in the metadata registry or a content repository at an address identified in the registry object; and
a form management module to receive a request for the form from a client device, the form management module is to access the form through the metadata registry based on the address of the metadata for the form, the form management module is to
transmit the form to the client device,
receive the form that is filled in back from the client device,
cause storage of the form that is filled in at the content repository at a different address;
cause creation of a new registry object based on the form that is filled in, the new registry object including metadata for the different address; and
cause creation of an association between the registry object for the form and the the new registry object for the form that is filled in at the metadata registry.

22. The apparatus of claim 21, wherein the form management module is to transmit the form back to the client device.

23. The apparatus of claim 21, wherein the form management module is to render the form prior to transmission of the form back to the client device.

24. The apparatus of claim 21, wherein the metadata registry is to create the different registry object for the form that is filled in.

25. The apparatus of claim 24, wherein the metadata registry is to create the association between the registry object and the different registry object.

26. The apparatus of claim 21, wherein the metadata includes an identification of a user that created the form.

27. The apparatus of claim 21, wherein the metadata includes an indication of a render type for the form.

* * * * *